United States Patent
Huang et al.

(10) Patent No.: US 11,989,005 B2
(45) Date of Patent: May 21, 2024

(54) ADAPTIVE THERMAL CEILING CONTROL SYSTEM

(71) Applicant: MediaTek Inc., Hsinchu (TW)

(72) Inventors: Bo-Jr Huang, Hsinchu (TW); Jia-Wei Fang, Hsinchu (TW); Jia-Ming Chen, Hsinchu (TW); Ya-Ting Chang, Hsinchu (TW); Chien-Yuan Lai, Hsinchu (TW); Cheng-Yuh Wu, Hsinchu (TW); Yi-Pin Lin, Hsinchu (TW); Wen-Wen Hsieh, Hsinchu (TW); Min-Shu Wang, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 41 days.

(21) Appl. No.: 17/490,663

(22) Filed: Sep. 30, 2021

(65) Prior Publication Data

US 2022/0334558 A1 Oct. 20, 2022

Related U.S. Application Data

(60) Provisional application No. 63/175,074, filed on Apr. 15, 2021.

(51) Int. Cl.
*G06F 1/20* (2006.01)
*G05B 19/4155* (2006.01)

(52) U.S. Cl.
CPC ......... *G05B 19/4155* (2013.01); *G06F 1/206* (2013.01); *G05B 2219/50333* (2013.01)

(58) Field of Classification Search
None
See application file for complete search history.

(56) References Cited

U.S. PATENT DOCUMENTS

| | | | | |
|---|---|---|---|---|
| 7,917,772 B1* | 3/2011 | Koniaris | ............... | G06F 1/3203 |
| | | | | 713/300 |
| 2011/0231030 A1* | 9/2011 | Carter | .................... | G06F 1/324 |
| | | | | 713/320 |
| 2013/0238912 A1* | 9/2013 | Priel | ........................ | G06F 1/26 |
| | | | | 713/300 |
| 2015/0331462 A1* | 11/2015 | Atkinson | ................ | G06F 1/324 |
| | | | | 713/100 |
| 2015/0331466 A1* | 11/2015 | Rozen | ................... | G06F 1/3206 |
| | | | | 713/340 |
| 2016/0197549 A1* | 7/2016 | Akgul | ..................... | H02M 3/04 |
| | | | | 327/541 |
| 2017/0068261 A1* | 3/2017 | Hsu | ......................... | G06F 1/206 |
| 2018/0005687 A1* | 1/2018 | Kawabe | ................ | G11C 11/406 |
| 2018/0203494 A1* | 7/2018 | Li | ............................ | G06F 1/206 |
| 2020/0319937 A1* | 10/2020 | Matthes | ................ | G06F 9/5094 |
| 2020/0363553 A1* | 11/2020 | Min | ......................... | G01D 5/24 |
| 2022/0136909 A1* | 5/2022 | Kim | ........................ | G06F 1/324 |
| | | | | 702/136 |

* cited by examiner

*Primary Examiner* — Danny Chan
(74) *Attorney, Agent, or Firm* — Tong J. Lee

(57) ABSTRACT

A system performs adaptive thermal ceiling control at runtime. The system includes computing circuits and a thermal management module. When detecting a runtime condition change that affects power consumption in the system, the thermal management module determines an adjustment to the thermal ceiling of a computing circuit, and increases the thermal ceiling of the computing circuit according to the adjustment.

20 Claims, 4 Drawing Sheets

| Number of Processors On | Imax (Amp) | Temp increase slope (°C/5ms) | Thermal ceiling (°C) |
|---|---|---|---|
| 4 | 15.00 | 20 | 85 |
| 3 | 11.25 | 15 | 90 |
| 2 | 7.50 | 10 | 95 |
| 1 | 3.75 | 5 | 100 |

Upper Bound: 107 °C

ADAPTIVE THERMAL CEILING CONTROL SYSTEM

CROSS-REFERENCE TO RELATED APPLICATIONS

This application claims the benefit of U.S. Provisional Application No. 63/175,074 filed on Apr. 15, 2021, the entirety of which is incorporated by reference herein.

TECHNICAL FIELD

Embodiments of the invention relate to thermal management of a computing system.

BACKGROUND

Modern computing systems incorporate multiple processors and multiple special-purpose integrated circuits into a single chip. A system with a limited form factor typically has limited cooling capabilities. Elevated chip temperatures lead to lower system reliability. Thus, thermal management becomes a major issue in a high power-density environment.

Some systems implement dynamic voltage and frequency scaling (DVFS), which is a technique that automatically adjusts the frequency and voltage of a processing circuit (e.g., a processor) at runtime. A common thermal management technique utilizes DVFS to perform throttling. When the temperature of a processor increases to the thermal ceiling, throttling is activated to lower the clock frequency and voltage of the processor, thereby reducing the power consumption and heat generation. However, decreasing the clock frequency and voltage of the processor also reduces the processor's performance.

Thus, there is a need for the improvement of thermal management to ensure safe operations of a system with minimal impact on the performance.

SUMMARY

In one embodiment, a system is provided to perform adaptive thermal ceiling control. The system includes multiple computing circuits and a thermal management module coupled to the computing circuits. The thermal management module is operative to detect a runtime condition change that affects power consumption in the system; determine an adjustment to a thermal ceiling of a computing circuit among the multiple computing circuits; and increase the thermal ceiling of the computing circuit according to the adjustment.

In another embodiment, a method is provided for adaptively adjusting a thermal ceiling in a system. The method comprises the step of detecting a runtime condition change that affects power consumption in the system. The method further comprises the steps of determining an adjustment to the thermal ceiling of a computing circuit in the system, and increasing the thermal ceiling of the computing circuit according to the adjustment.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a thermal management technique that adaptively adjusts the thermal ceiling of a computing circuit (e.g., a processor) when a runtime condition changes. A runtime condition changes when the power consumption of a computing circuit and/or system changes during runtime. One example of runtime condition change is when the system turns on or off a processor. Another example of runtime condition change is when a processor starts to draw in more current, which may be caused by, among other reasons, an increase in workload. When a runtime condition change is detected, the thermal ceiling of one or more computing circuits may be increased to allow operation at an increased temperature and the same clock frequency. Thus, the performance of the computing circuit may be maintained. When the thermal ceiling cannot be safely increased, the system may throttle the performance by lowering the clock frequency and voltage of the computing circuit to reduce the power consumption and heat generation. Thus, the thermal management technique described herein can protect the system from failure and maintain the performance when it is safe to do so.

In the system described herein, a "processor" may be a central processing unit (CPU), a digital signal processor (DSP), a multimedia processor, a graphics processing unit (GPU), a vector processor, or another general purpose or special purpose processing circuitry. In some systems, a processor may be the same as a "core", a "processor core" or a "CPU core," while in some other systems a processor may include multiple cores. A multi-processor system may also be known as a multicore system.

Figure 1:
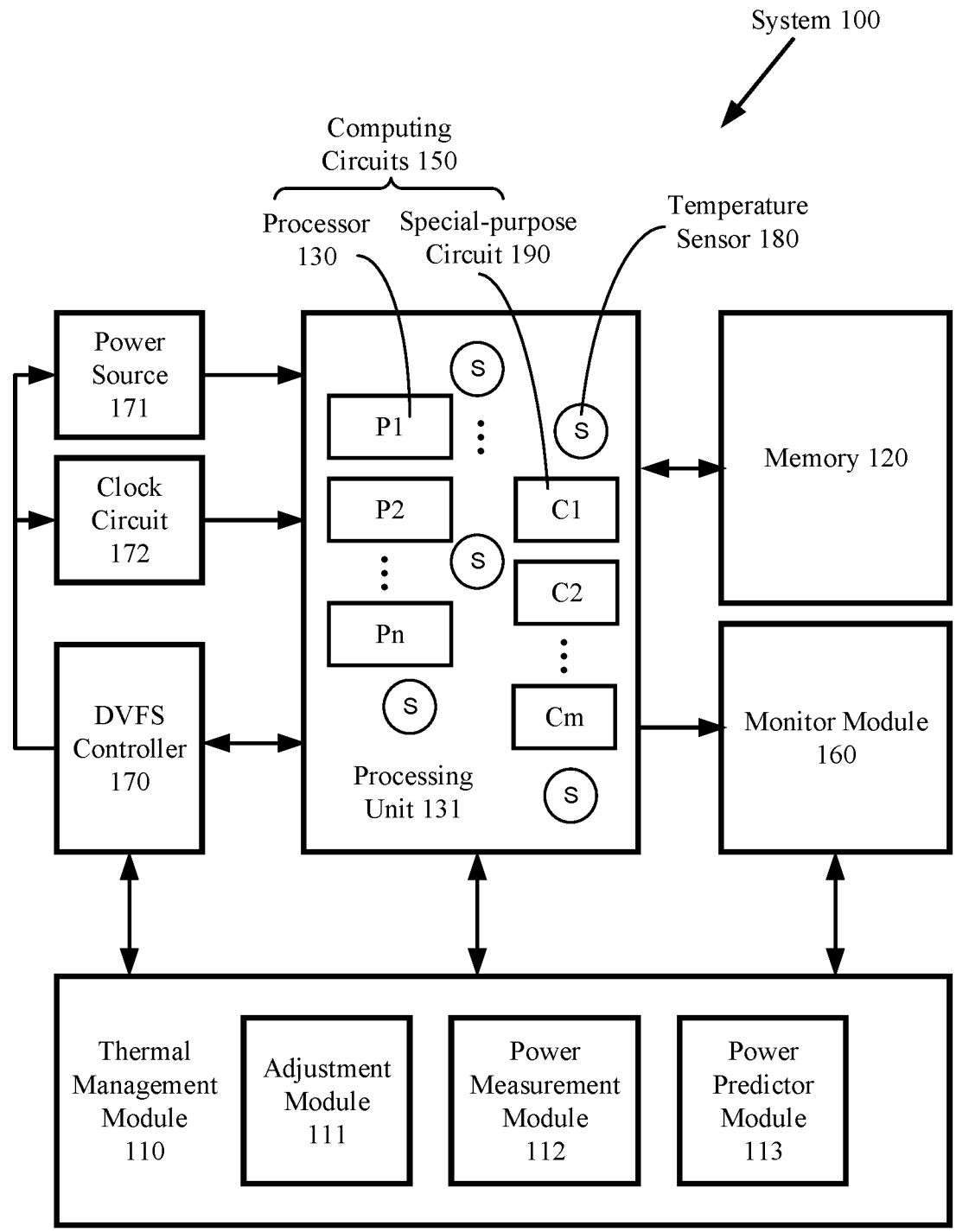
FIG. 1 illustrates a system according to one embodiment.

FIG. 1 illustrates an example of a system 100 according to one embodiment. The system 100 includes a processing unit 131, which further includes processors 130 (e.g., P1, P2, . . . , Pn) and special-purpose circuits 190 (e.g., C1, C2, . . . , Cm), where index n and index m can be any integer greater than or equal to one. Each processor 130 can be any computing circuitry, such as a general-purpose processor, a graphics processing unit (GPU), a digital signal processor (DSP), a media processor, or the like. Each special-purpose circuit 190 can be an application-specific integrated circuit (ASIC) or the like. In an alternative embodiment, the system 100 may include any combination of the processors 130 and/or the special-purpose circuits 190. For ease of description, the term "computing circuit 150" is used throughout this disclosure to denote any of the processors 130 or any of the special-purpose circuits 190. The thermal ceiling adjustment technique and method described herein can be applied to any computing circuit 150 receiving voltage and clock signals and generating heat during operation.

The processors 130 may have the same processor type and/or different processor types. Processors of different processor types have different hardware characteristics which may be measured by their capacities (e.g., measured by million instructions per second (MIPS)) and/or energy efficiency (e.g., measured by power consumption). Processors of different processor types may share the same instruction set architecture (ISA); that is, they can execute the same programs and software applications. In one embodiment, the processors of different processor types may have different microarchitectures to deliver different compute performance and different power efficiency.

In one embodiment, the processing unit 131 includes a number of temperature sensors 180 (each denoted as S) to measure the temperature of each computing circuit 150. Additional temperature sensors may be distributed throughout the system 100 to measure environmental temperatures. In one embodiment, the processing unit 131 can be integrated on a single integrated circuit die, or on separate dies in a multiple-circuit package. In one embodiment, the system 100 may be integrated as a system-on-a-chip (SOC).

The system 100 further includes a memory 120. The memory 120 may include on-chip and off-chip memory devices such as dynamic random access memory (DRAM), static RAM (SRAM), flash memory, and other volatile or non-volatile memory devices. The system 100 also includes a power source 171 to provide power and a clock circuit 172 to provide clock signals to each computing circuit 150. The system 100 can be connected to networks (e.g., a personal area network, a local area network, a wide area network, etc.). It is understood the embodiment of FIG. 1 is simplified for illustration purposes. Additional hardware components may be included.

In one embodiment, the system 100 includes a dynamic voltage frequency scaling (DVFS) controller 170 to control the operating point (e.g., frequency and voltage) of the activated computing circuits 150. The term "activated" herein is equivalent to "powered on." The DVFS controller 170 may control the clock circuit 173 to individually increase or decrease the clock frequency of each computing circuit 150, and may control the power source 172 to individually increase or decrease the voltage supplied to each computing circuit 150.

In one embodiment, the system 100 includes a monitor module 160. The monitor module 160 communicates with the temperature sensors 180 and other sensors and measurement circuits distributed in the processing unit 131 and throughout the system 100. The measurement circuits may measure the dynamic current drawn by each computing circuit 150 during switching and the leakage current that flows through each computing circuit 150. The measurements and the sensor-provided data may be used as indicators of dynamic power consumption and leakage power consumption of each computing circuit 150. The monitor module 160 also communicates with each computing circuit 150 to gather information about its operating status. The monitor module 160 may communicate with monitors and/or counters implemented in hardware and/or software to monitor the operation of each computing circuit 150. For example, the monitor module 160 may obtain the amount of workload, execution time, powered on or off, and the like, of each computing circuit 150. The information gathered by the monitor module 160 is sent to a thermal management (TM) module 110.

The TM module 110 communicates with the monitor module 160 and may also communicate with the processing unit 131 to obtain the measurements, the sensor-provided temperature data, and the operating status of each computing circuit 150. Based on the obtained information, the TM module 110 detects a runtime condition change and determines a corresponding adjustment, if any, to the thermal ceiling of one or more of the computing circuits 150.

In one embodiment, the TM module 110 includes a power measurement module 112 to calculate the dynamic and leakage power consumption of each computing circuit 150 based on direct measurements of the operating voltage and the current drawn by each computing circuit 150. The TM module 110 further includes a power predictor module 113 to predict the dynamic and leakage power consumption of each computing circuit 150 based on information from the monitor module 160 and the processing unit 131. In one embodiment, the power predictor module 113 may perform machine-learning operations to predict the power consumption based on physical characteristics of the computing circuits 150 and past and present operating statuses of the computing circuits 150. Based on the power measurements and the predictions, the TM module 110 detects a runtime condition change. In response to the detection, an adjustment module 111 in the TM module 110 determines the amount of adjustment to the thermal ceiling of the one or more computing circuits 150 affected by the runtime condition change. The TM module 110 may alternatively signal the DVFS controller 170 to adjust the clock frequency and the operating voltage of one or more of the computing circuits 150. The adjustment module 111 may determine to lower the clock frequency of a computing circuit 150 when the circuit's thermal ceiling cannot be raised; e.g., when an increase to the thermal ceiling would cause the computing circuit to operate at a temperature that violates the minimal safety margin. More details about the safety margin will be provided in connection with FIG. 2.

One or more of the DVFS controller 170, the monitor module 160, and the TM module 110 may be implemented in hardware circuitry, software executed by hardware circuitry, or a combination of hardware and software. The hardware circuitry may be special-purpose or general-purpose hardware. Software may be stored on any non-transitory computer-readable medium for use by the system 100 or by methods executed by the system 100. In one embodiment, the TM module 110 may be a co-processing circuit that executes software (e.g., machine-learning algorithms for power consumption predictions). Alternatively, the software may be executed by one or more of the computing circuits 150.

Figures 2, 3:
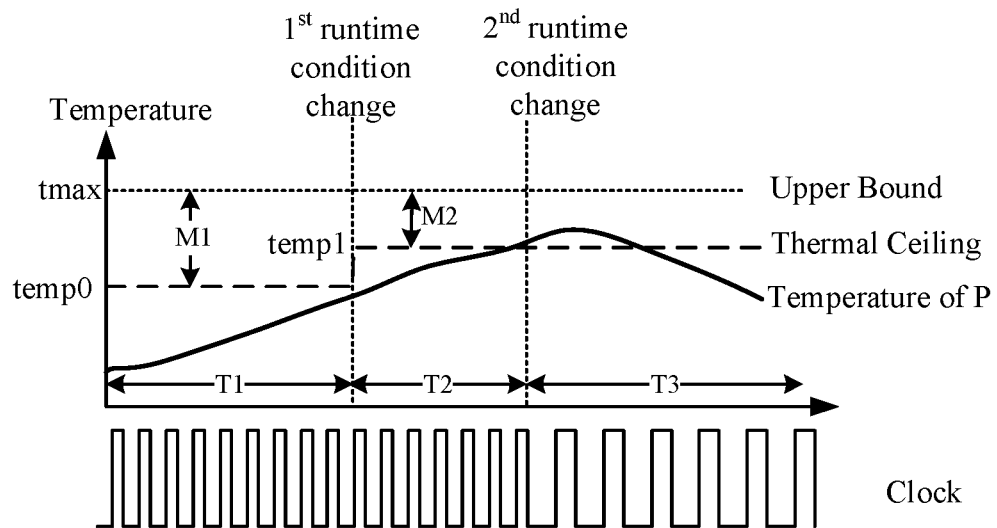
FIG. 2 is a diagram illustrating dynamic thermal ceiling adjustment according to one embodiment.
FIG. 3 illustrates an example of the thermal ceiling versus the number of activated processors according to one embodiment.

FIG. 2 is a diagram illustrating dynamic thermal ceiling adjustment according to one embodiment. The temperature of a computing circuit P (e.g., any of the computing circuits 150 in FIG. 1) is shown as a solid curve, the temperature upper bound of P is shown as a dotted line, and the thermal ceiling of P is shown as a dashed line. During time period T1, the temperature of P increases to the thermal ceiling temp0. The temperature increase indicates a runtime condition change ("the first runtime condition change"). Upon detection of the first runtime condition change, the system (e.g., the TM module 110 in FIG. 1) raises the thermal ceiling of P from temp0 to temp1. During time period T2, the temperature of P continues to increase to the new thermal ceiling temp1. This temperature increase indicates another runtime condition change ("the second runtime condition change"). The first and the second runtime condition changes may have the same or different underlying causes (e.g., increased workload, prolonged execution time, etc.). At the detection of the second runtime condition change, the system 100 throttles the performance of P by decreasing the clock frequency of P. As a result, the temperature of P drops during time period T3. It is noted that at no time does the temperature of P reach the temperature upper bound (tmax).

The decision of whether to increase the thermal ceiling or to throttle the performance may depend on the amount of safety margin for a computing circuit to operate safely. The TM module 110 (FIG. 1) can raise the thermal ceiling of P when the increased thermal ceiling still maintains a sufficient safety margin from the temperature upper bound. The TM module 110 does not increase the thermal ceiling when the minimal safety margin cannot be maintained. The minimal safety margin of P depends on, among other factors, the rate or slope of P's temperature increase. For example, the temperature increase slope may depend on the number of activated computing circuits (i.e., turned on) in the system. When there are more activated computing circuits in the system, more current will flow through the system and each activated computing circuit will experience a greater rate of temperature increase.

In the example of FIG. 2, the safety margin during time period T1 is M1 and during time period T2 is M2, where M1>M2. When the second runtime condition change is detected, the system determines that M2 is the minimal safety margin for P given the runtime condition; that is, any decrease of M2 would cause P to fail. Thus, the system determines to throttle P's performance instead of further increasing P's thermal ceiling. The safety margin provides a margin of error in the temperature measurements. For example, if temperature measurements are provided to the TM module 110 every 5 milliseconds (ms), the minimal safety margin can be set to be at least the value of the estimated temperature increase over 5 ms.

When an increase to the thermal ceiling would violate the minimal safety margin, the computing circuit's clock frequency is throttled and the temperature is decreased as a result. The system may restore the clock frequency when the computing circuit's temperature is lowered to a level; e.g., below temp1 or at temp0.

FIG. 3 illustrates an example of the thermal ceiling versus the number of activated processors according to one embodiment. Although processors are used in this example, it is understood that the example applies to any computing circuit 150 in FIG. 1. In this example, the number of activated processors is monitored as a runtime condition. When the number of activated processors decreases (i.e., fewer processors are turned on), less current is consumed and, therefore, the temperature increase slows down. In response to the fewer activated processors, the system may increase the thermal ceiling of the activated processor or processors to maintain their clock frequency and performance. In this example, the temperature upper bound is 107 degrees Celsius. The temperature increase slope, measured by degrees Celsius per 5 ms, is given as a pre-calibrated parameter of the system. The minimal safety margin is calculated as the temperature increase slope over 5 ms plus a fudge factor (e.g., 2 degrees Celsius). The default thermal ceiling is 85 degrees Celsius. When one or more of the processors are turned off, the thermal ceiling for each activated processor can be raised from 85 degrees Celsius by an amount that is equal to the temperature upper bound minus the minimal safety margin. In the example of FIG. 3, the thermal ceilings for activated processors of one, two, and three can be raised to 100, 90, and 95, and 90 degrees Celsius, respectively.

Figure 4:
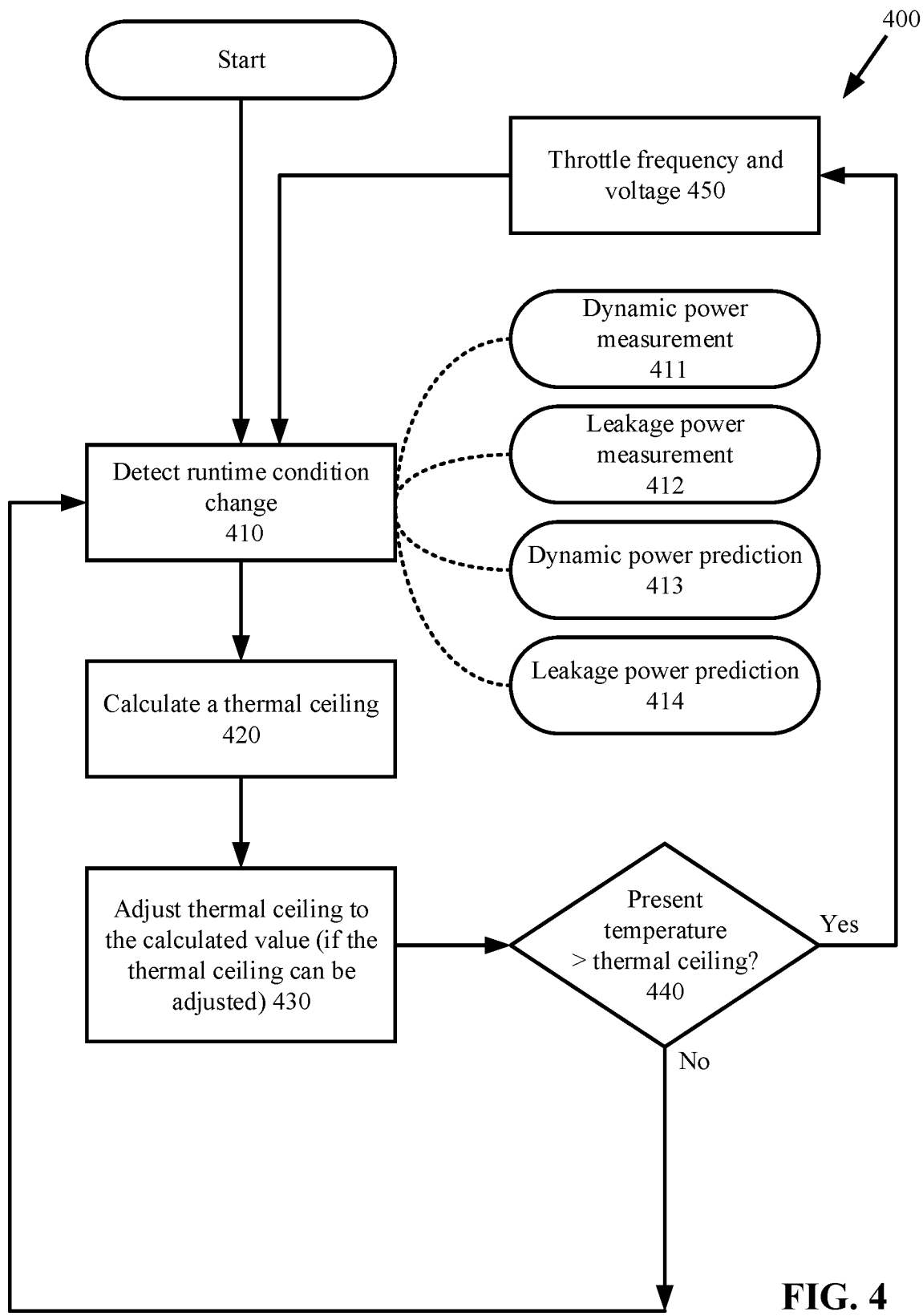
FIG. 4 is a flow diagram illustrating a thermal ceiling adjustment process according to one embodiment.

FIG. 4 is a flow diagram illustrating a process 400 of thermal ceiling adjustment according to one embodiment. The process 400 may be performed by a system, such as the system 100 in FIG. 1, or any system of one or more computing circuits.

The system monitors runtime conditions; e.g., dynamic and leakage power consumption of each computing circuit. At step 410, the system detects a change in the runtime condition of the system. The detection takes into account a number of factors, including but not limited to: dynamic power measurement 411, leakage power measurement 412, dynamic power prediction 413, and leakage power prediction 414.

Upon detecting a runtime condition change, the system at step 420 calculates a thermal ceiling for the one or more computing circuits (e.g., P) affected by the runtime condition change. The calculation takes into account the temperature increase slope of P. For example, the thermal ceiling can be calculated by subtracting a safety margin from the temperature upper bound, where the safety margin is equal to the temperature increase slope plus a fudge factor. The calculation result may indicate that the thermal ceiling stays unchanged; e.g., when increasing the thermal ceiling would violate the minimal safety margin. If the calculation result indicates that the thermal ceiling can be adjusted, P's thermal ceiling is adjusted to the calculated value at step 430. At step 440, the present temperature of P is compared with the thermal ceiling. If the present temperature exceeds the thermal ceiling, the system throttles P's performance by reducing its voltage and frequency at step 450. If the present temperature does not exceed the new thermal ceiling, the process 400 returns to step 410 in which the system continues to monitor and detect runtime condition changes.

In one embodiment, the dynamic power measurement 411 and the leakage power measurement 412 can be obtained by direct measurements of dynamic current and leakage current, respectively. The dynamic power prediction 413 can be made based on one or more of a number of factors, including but not limited to: voltage, frequency, system configuration (e.g., the number of activated computing circuits in the system), workload (e.g., measured by an averaged number of instructions per cycle (IPC)), execution time of a computing circuit actively executing tasks, etc. The leakage power prediction 414 can be made based on one or more of a number of factors, including but not limited to: voltage, process variation caused by the fabrication process, system configuration (e.g., the number of activated computing circuits in the system), power gating (e.g., the amount of circuitry being turned on or off in a computing circuit), etc. In one embodiment, some or all of the factors on which the predictions 413 and 414 are based may be collected or monitored by the monitor module 160 (FIG. 1).

In a system with multiple computing circuits, the system may adjust the thermal ceiling of each computing circuit independently of one another. The power measurements and predictions 411-414 may be performed on each computing circuit based on the physical characteristics (e.g. process variation, etc.) and operating status (e.g., voltage, workload, power gating, etc.) of each computing circuit. Factors that are common to multiple computing circuits, such as the number of activated computing circuits in the system, may also be used in the determination of the thermal ceiling adjustment of the multiple computing circuits.

Figure 5:
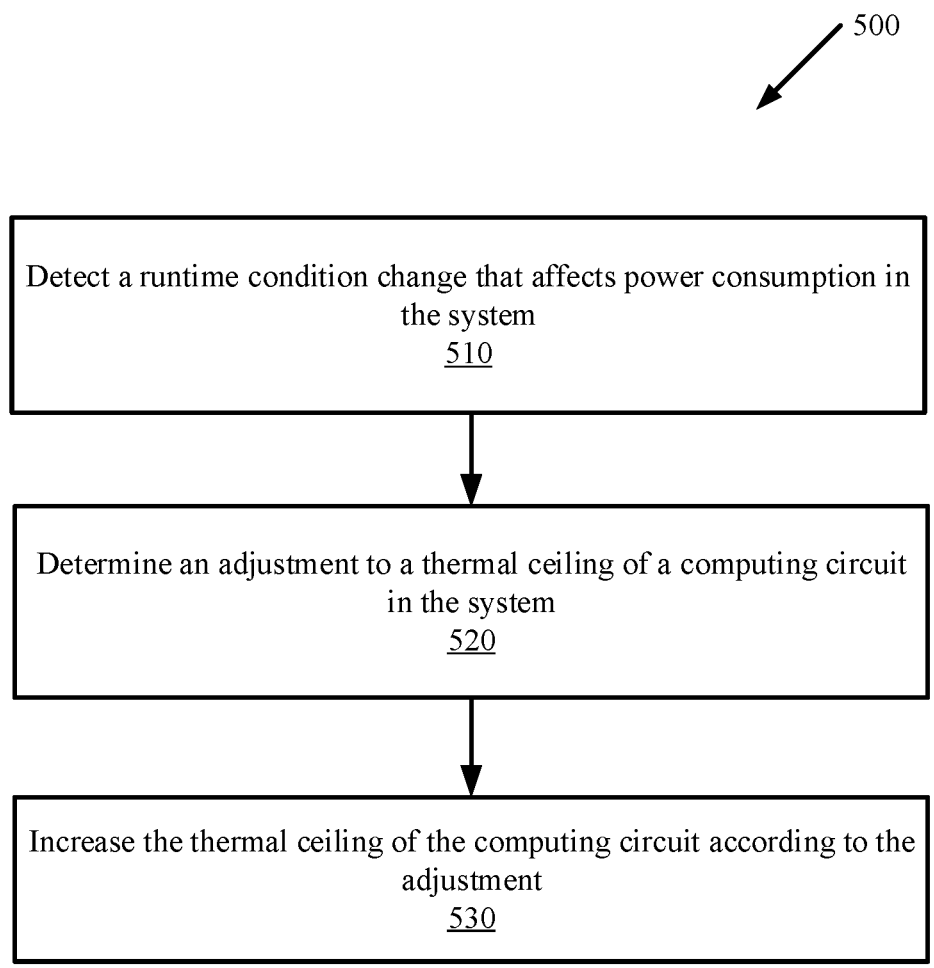
FIG. 5 is a flow diagram illustrating a method for adjusting the thermal ceiling of a computing circuit according to one embodiment.

FIG. 5 is a flow diagram illustrating a method 500 for adjusting a thermal ceiling of a computing circuits according to one embodiment. The method 500 may be performed by a computing system, such as the system 100 in FIG. 1 or a system with one or more computing circuits. The system at step 510 detects a runtime condition change that affects power consumption in the system. The system at step 520 determines an adjustment to the thermal ceiling of a computing circuit in the system. The system at step 530 increases the thermal ceiling of the computing circuit according to the determined adjustment.

In one embodiment, the runtime condition change includes a change to dynamic power consumption and leakage power consumption. The runtime condition change may include a change in the number of activated computing circuits in the system. The detection of the runtime condition change may be based on measurements and predictions of power consumption. The predictions of power consumption may include a prediction of dynamic power consumption based on one or more of: voltage, frequency, system configuration, workload, and execution time. The predictions of power consumption may include a prediction of leakage power consumption based on one or more of: voltage, process variation, system configuration, and power gating.

In one embodiment, the thermal ceiling adjustment is determined based on a temperature increase slope of the computing circuit. The system compares the present temperature of the computing circuit with the thermal ceiling of the computing circuit to determine whether to throttle the performance of the computing circuit. The throttling temperature may change dynamically during runtime. The thermal ceiling may change dynamically with changes in runtime conditions.

The operations of the flow diagrams of FIGS. 4 and 5 have been described with reference to the exemplary embodiment of FIG. 1. However, it should be understood that the operations of the flow diagrams of FIGS. 4 and 5 can be performed by embodiments of the invention other than the embodiment of FIG. 1, and the embodiment of FIG. 1 can perform operations different than those discussed with reference to the flow diagrams. While the flow diagrams of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

Various functional components, blocks, or modules have been described herein. As will be appreciated by persons skilled in the art, the functional blocks or modules may be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system performing adaptive thermal ceiling control, comprising:
   a plurality of computing circuits; and
   a thermal management module coupled to the plurality of computing circuits, the thermal management module operative to:
     detect a runtime condition change that changes power consumption in the system; and
     determine an adjustment to a thermal ceiling of a computing circuit among the plurality of computing circuits, wherein the thermal management module when determining the adjustment is further operative to:
       determine a safety margin based on a temperature increase rate of the computing circuit,
       subtract the safety margin from a temperature upper bound of the computing circuit to obtain a calculated thermal ceiling value,
       when the thermal ceiling is lower than the calculated thermal ceiling value, raise the thermal ceiling to the calculated thermal ceiling value, and
       maintain the thermal ceiling when raising the thermal ceiling violates a minimal value of the safety margin.

2. The system of claim 1, wherein the runtime condition change includes a change to dynamic power consumption and leakage power consumption.

3. The system of claim 1, wherein the thermal management module is further operative to detect the runtime condition change based on measurements and predictions of power consumption.

4. The system of claim 3, wherein the predictions of power consumption include a prediction of dynamic power consumption based on one or more of: voltage, frequency, system configuration, workload, and execution time.

5. The system of claim 3, wherein the predictions of power consumption include a prediction of leakage power consumption based on one or more of: voltage, process variation, system configuration, and power gating.

6. The system of claim 1, wherein the runtime condition change includes a change in the number of activated computing circuits in the system.

7. The system of claim 1, wherein the thermal ceiling of each computing circuit is adjusted independent of one another.

8. The system of claim 1, wherein the thermal management module is further operative to compare a present temperature of the computing circuit with the thermal ceiling to determine whether to throttle performance of the computing circuit.

9. The system of claim 8, wherein the performance of the computing circuit is throttled at a throttling temperature which changes dynamically during runtime.

10. The system of claim 1, wherein the thermal ceiling changes dynamically with changes in runtime conditions.

11. A method for adaptively adjusting a thermal ceiling in a system, comprising:
    detecting a runtime condition change that changes power consumption in the system; and determining an adjustment to the thermal ceiling of a computing circuit in the system, wherein determining the adjustment further comprises:

determining a safety margin based on a temperature increase rate of the computing circuit, subtracting the safety margin from a temperature upper bound of the computing circuit to obtain a calculated thermal ceiling value, when the thermal ceiling is lower than the calculated thermal ceiling value, raising the thermal ceiling to the calculated thermal ceiling value, and maintaining the thermal ceiling when raising the thermal ceiling violates a minimal value of the safety margin.

12. The method of claim 11, wherein the runtime condition change includes a change to dynamic power consumption and leakage power consumption.

13. The method of claim 11, wherein detecting the runtime condition change is based on measurements and predictions of power consumption.

14. The method of claim 13, wherein the predictions of power consumption include a prediction of dynamic power consumption based on one or more of: voltage, frequency, system configuration, workload, and execution time.

15. The method of claim 13, wherein the predictions of power consumption include a prediction of leakage power consumption based on one or more of: voltage, process variation, system configuration, and power gating.

16. The method of claim 11, wherein the runtime condition change includes a change in the number of activated computing circuits in the system.

17. The method of claim 11, wherein the system includes a plurality of computing circuits, and the thermal ceiling of each computing circuit is adjusted independent of one another.

18. The method of claim 11, further comprising:

comparing a present temperature of the computing circuit with the thermal ceiling to determine whether to throttle performance of the computing circuit.

19. The method of claim 18, wherein the performance of the computing circuit is throttled at a throttling temperature which changes dynamically during runtime.

20. The method of claim 11, wherein the thermal ceiling changes dynamically with changes in runtime conditions.

* * * * *